(12) United States Patent
Xiongwei

(10) Patent No.: US 6,429,268 B1
(45) Date of Patent: Aug. 6, 2002

(54) METHOD AND APPARATUS FOR PHASE SEPARATED SYNTHESIS

(75) Inventor: Ni Xiongwei, Edinburgh (GB)

(73) Assignee: Heriot-Watt University, Edinburgh (GB)

(*) Notice: Subject to any disclaimer, the term of this patent is extended or adjusted under 35 U.S.C. 154(b) by 0 days.

(21) Appl. No.: 09/674,342

(22) PCT Filed: Apr. 28, 1999

(86) PCT No.: PCT/GB99/01323

§ 371 (c)(1), (2), (4) Date: Oct. 30, 2000

(87) PCT Pub. No.: WO99/55457

PCT Pub. Date: Nov. 4, 1999

(30) Foreign Application Priority Data

Apr. 28, 1998 (GB) ............................................. 9808969
Apr. 30, 1998 (GB) ............................................. 9809230

(51) Int. Cl.$^7$ ................................................. C08F 2/10
(52) U.S. Cl. .................. 526/64; 422/132; 422/196; 422/197; 422/234; 422/235; 526/88
(58) Field of Search ................................. 422/132, 196, 422/197, 234, 235; 526/64, 88

(56) References Cited

U.S. PATENT DOCUMENTS

| 3,353,918 A | * 11/1967 | Perrin |
| 3,674,740 A | 7/1972 | Vernaleken et al. |
| 3,855,368 A | 12/1974 | Prochazka et al. |
| 3,860,218 A | 1/1975 | Hürlimann |
| 4,209,599 A | * 6/1980 | Brady et al. .................. 526/64 |
| 4,271,007 A | 6/1981 | Souhrada et al. |
| 5,602,216 A | 2/1997 | Juvet |

FOREIGN PATENT DOCUMENTS

| CA | 1 146 164 | 5/1983 |
| CA | 1 199 750 | 1/1986 |
| EP | 0 400 479 | 12/1990 |
| EP | 0 540 180 | 5/1993 |
| EP | 0 631 809 | 1/1995 |
| WO | 87/00079 | 1/1987 |

* cited by examiner

Primary Examiner—David W. Wu
Assistant Examiner—William K. Cheung
(74) Attorney, Agent, or Firm—Venable; Gabor J. Kelemen

(57) ABSTRACT

An apparatus and method for a continuous phase-separated synthesis of particulates, and in particular an apparatus and method for a continuous polymerization which utilizes a reactor vessel having stationary annular baffles through which an aqueous medium is circulated, and to which a monomer and initiator are added. During polymerization, as the fluid circulates through the reactor vessel, the eddies created by the baffles enhance a thorough and even mixing of the fluid.

21 Claims, 3 Drawing Sheets

METHOD AND APPARATUS FOR PHASE SEPARATED SYNTHESIS

This invention relates to an apparatus and method for phase separated synthesis, and in particular to an apparatus and method for continuous phase separated synthesis of particulates. Particularly this invention relates to an apparatus and method for continuous polymerisation.

This invention further relates to an improved apparatus and method for phase separated synthesis of particulates in a batch process and in particular to a crystallisation method and apparatus.

In this field it is known to perform phase separated synthesis of any kind in a batch process. Processes such as polymerisation or crystallisation are normally carried out in a stirred tank reactor (STR). A STR is exclusively operated in a batch mode. Phase separated synthesis generally requires mixing of fluid which, in an STR, is carried out by a mechanically agitated impeller or impellers.

In an STR, mixing of fluid in the vicinity of an impeller is more intensive and of higher shear rates than mixing of fluid distant from the impeller, e.g. adjacent the walls of the tank. This gradient of mixing intensity in the STR results in poor performance in processes relating to particulates, and results in particles of a wider size distribution than is desirable.

A batch process is a complete distinct process. It is necessary to have downtime between batches during which the apparatus in which the process takes place is cleaned. This is inefficient in large scale processes such as polymerization.

It is known to produce liquid polymers by continuous polymerization. Such a process, using a pulsatile flow reactor is described in EPO 0540180. However, that process is restricted to the single phase synthesis of a specific polymer. In addition, the process must be completed in a single pass of the reactor vessel before the vessel becomes fouled, or the process must be regularly halted to purge the reactor vessel.

It is an object of the present invention to provide a apparatus and method for phase separated synthesis of particulates in a continuous manner.

It is a further object of the present invention to provide an improved apparatus and method for phase separated synthesis of particulates in a batch operation.

According to the present invention there is provided an apparatus for polymerization comprising:

a reactor vessel;
supply means to supply a substantially continuous feed of an aqueous medium through the reactor vessel; and
oscillation means to oscillate liquid within the reactor vessel, said reactor vessel comprising:
an inlet in communication with said supply means;
an outlet adaptable for communication with said supply means;
a plurality of stationary baffles; and
at least one port for the introduction of process components and or initiators; characterized in that said reactor vessel comprises purging means to deter fouling, thereby adapting said apparatus for phase separated synthesis of particulates in a continuous manner.

Typically said reactor vessel comprises a plurality of ports for the introduction of process components and/or initiators. Preferably said ports are spaced apart from said oscillation means.

Preferably said outlet is adaptable for communication with a drain.

Preferably said reactor vessel comprises a plurality of substantially parallel tubular sections connected in series.

Preferably said oscillation means comprises a chamber and a diaphragm. More preferably said oscillation means comprises bellows.

Preferably said baffles are annular.

Preferably said baffles have a free area ratio of approximately 10–30%, especially approximately 20%, for example 21%.

Typically the baffles are equally spaced with a spacing of 1–2D where D is the diameter of the reactor vessel, for example, 1.8D.

The apparatus may further comprise temperature control means to vary the temperature of the reactor vessel. Preferably said temperature control means comprises a water-filled jacket. Said jacket may substantially surround said reactor vessel. Said jacket may extend substantially the length of said reactor vessel.

Preferably said vessel is of stainless steel.

Preferably said baffles are of stainless steel.

Preferably said apparatus further comprises premixing means to mix a process component and an initiator or initiators prior to their introduction to the reactor vessel. Said premixing means may comprise a stirred tank reactor. Alternatively said premixing means may comprise a reactor vessel comprising a plurality of baffles; and drive means to oscillate said baffles to mix the process component and the initiator or initiators. More preferably said apparatus comprises a plurality of premixing means.

Preferably said supply means comprises a reservoir positioned above the level of the reactor vessel.

Further according to the present invention there is provided a method of polymerization comprising the steps of:

feeding an aqueous medium substantially continuously through a reactor vessel comprising a plurality of stationary baffles;
supplying a fluid containing at least one process component and an initiator or initiators to the vessels; and
oscillating the liquid within the reactor vessel; characterised in that said method comprises the step of introducing an inert gas to the medium to purge the medium to facilitate the phase separated synthesis of particulates of specified size in a continuous manner.

Further according to the present invention there is provided a method of polymerization in a continuous manner comprising the steps of:

feeding an aqueous medium substantially continuously through a reactor vessel comprising a plurality of stationary baffles;
supplying a fluid containing at least one process component and an initiator or initiators to the reactor vessel; and
oscillating the fluid in the reactor vessel to produce particulates of specified size.

Preferably said method employs an oscillation rate of the medium of between 1 and 4 Hz. Typically the method employs an oscillation amplitude in the reactor vessel of between 0 and 20 mm.

Preferably said method includes the step of premixing a process component with an initiator prior to their supply to the reactor vessel. Said method may include the step of premixing a monomer with an initiator prior to their supply to the reactor vessel. Said method may include the step of premixing a surfactant or surfactants with an initiator prior to their supply to the reactor vessel. Said method may include the step of premixing a colloid with an initiator prior to their supply to the reactor vessel.

The method may include the step of altering the temperature of the reactor vessel.

Preferably the method is employed to produce polyacrylamide or polymethylmethacrylate or polystyrene or similar.

Further according to the present invention there is provided an apparatus for phase separated synthesis of particulates in a batch process comprising:

a reactor vessel comprising a plurality of baffles; and drive means to oscillate said baffles to mix fluid in the reactor vessel.

Typically said reactor vessel is tubular.

Preferably said baffles are annular.

Preferably said baffles have a free area of approximately 10–40%, especially approximately 20%, for example 21%.

Typically the baffles are equally spaced with a spacing of 1.25–2D, where D is the diameter of the reactor vessel, for example 1.5D.

The apparatus may further comprise temperature control means to vary the temperature the contents of the reactor vessel. Preferably said temperature control means comprises a water-filled jacket. Preferably said jacket surrounds the reactor vessel.

Typically said apparatus is adaptable for phase separated synthesis in a large scale, for example with a reactor vessel of 0.1 to 5 m in diameter.

Preferably said apparatus may be adapted merely to mix solutions.

Further according to the present invention there is provided a method of phase separated synthesis of particulates in a batch process comprising the steps of introducing fluid-based process components in a reactor vessel comprising a plurality of annular baffles adapted for reciprocal motion; and reciprocating said baffles.

Further according to the present invention there is provided a method of mixing solutions comprising the steps of introducing the solutions to a reactor vessel comprising a plurality of annular baffles adapted for reciprocal motion; and reciprocating said baffles.

Embodiments of the present invention will now be described by way of example only with reference to the following examples and the accompanying drawings in which:

BRIEF DESCRIPTION OF THE DRAWINGS

Referring to FIG. 1, a continuous polymerization apparatus 1 comprises a reactor vessel 2 consisting of 14 parallel tubes 3 of 40 mm diameter. The reactor vessel is of much narrower diameter than known polymerization apparatus. Adjacent tubes 3 are connected by U-bends 6 to form a continuous serpentine vessel 2 of total length of approximately 25,000 mm. This configuration of reactor vessel 2 provides economic use of space.

Figure 1:
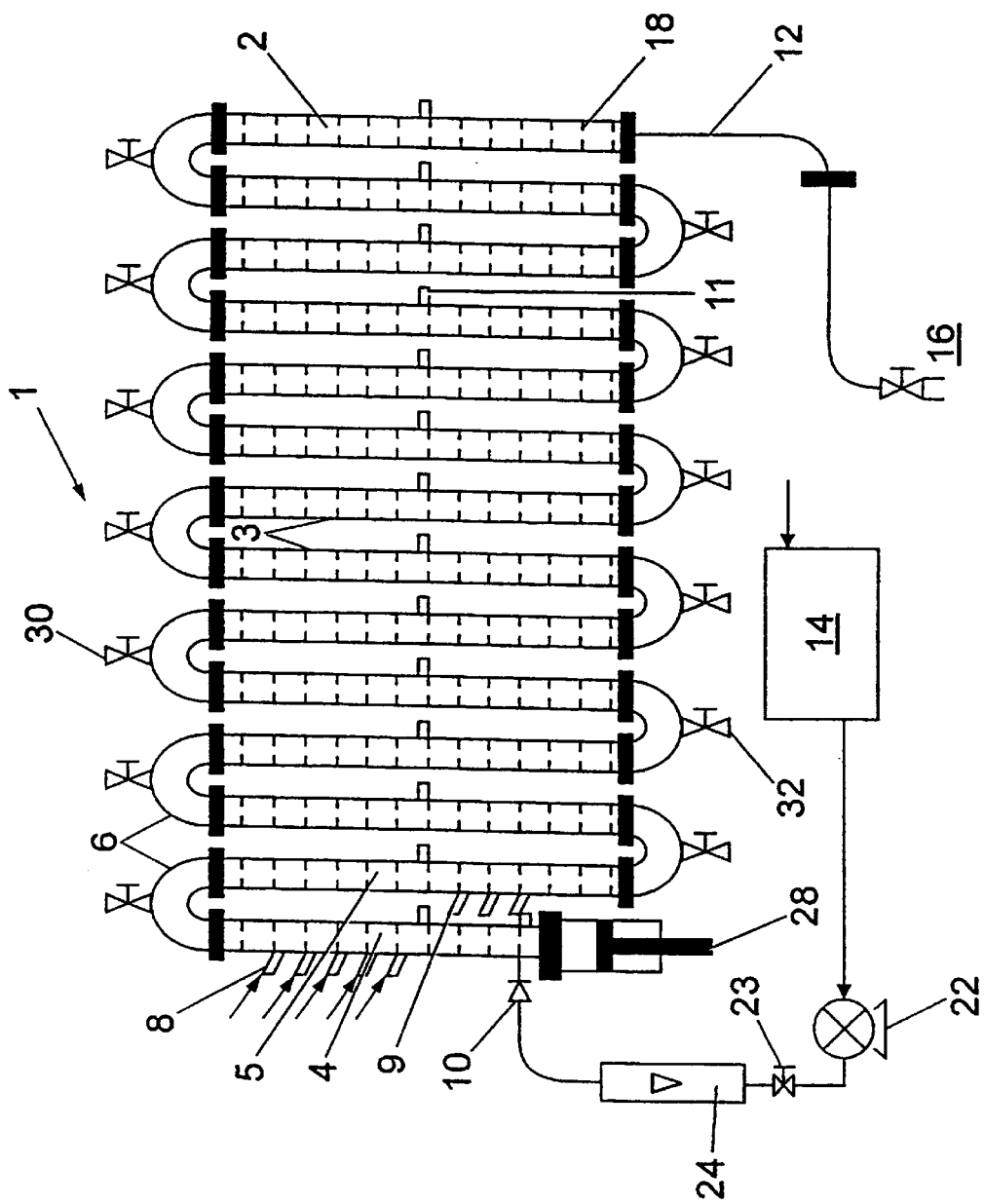
FIGS. 1 and 2 are schematic drawings of a continuous oscillatory baffled reactor in accordance with an aspect of the present invention.
Figure 2:
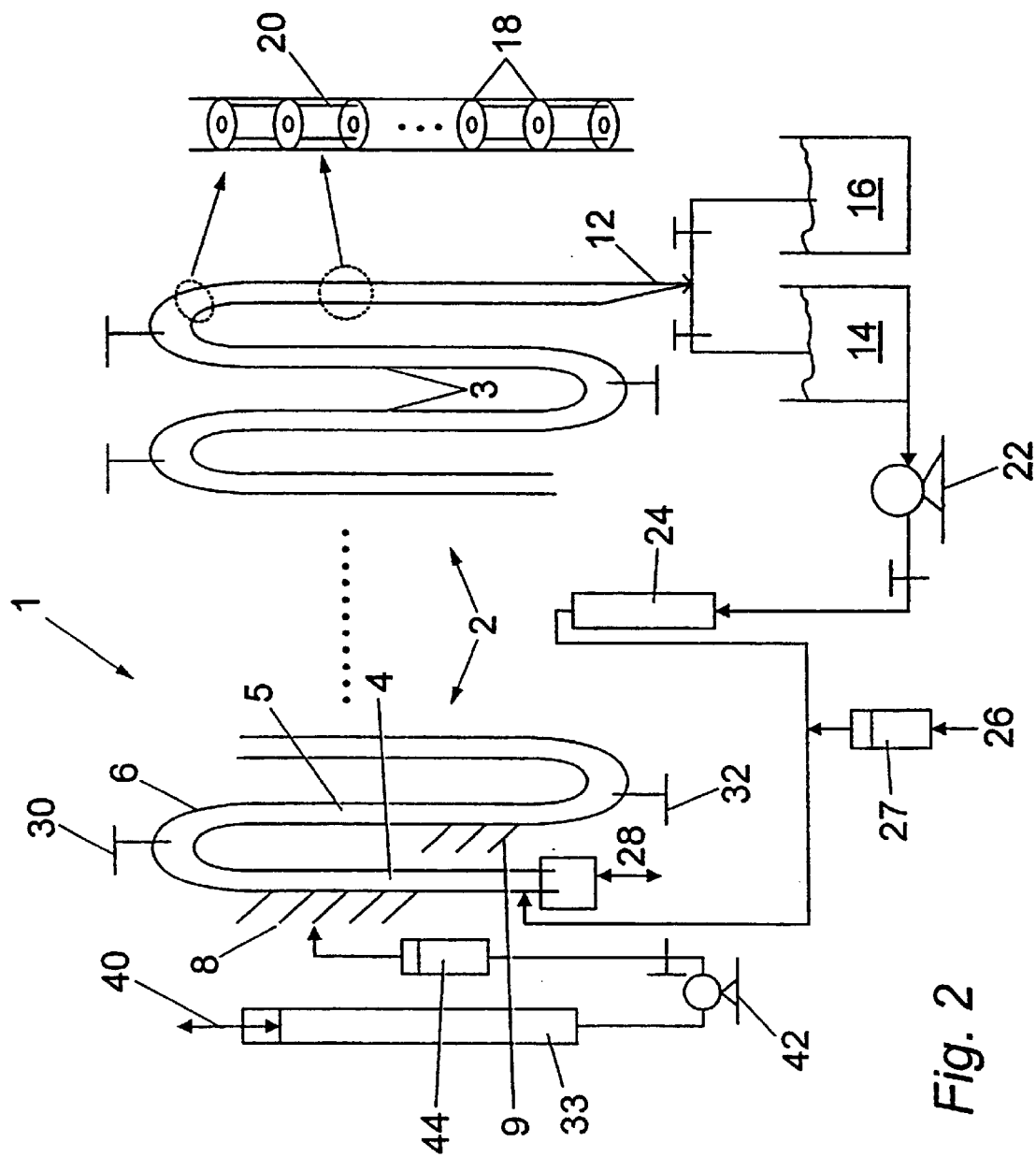
Figure 3:
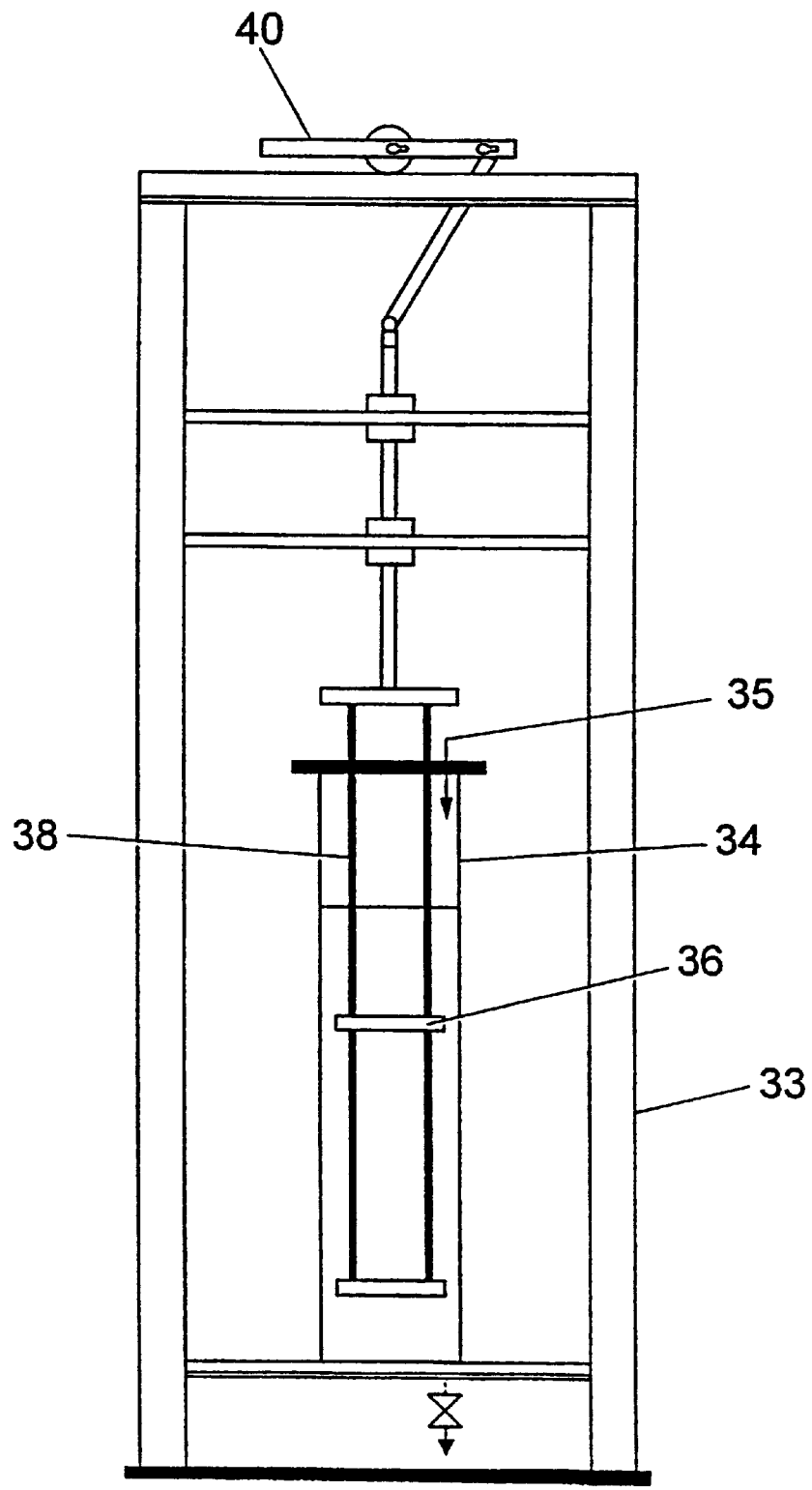
FIG. 3 is a schematic diagram of a premixer for use with a continuous oscillatory baffled reactor in accordance with an aspect of the present invention.

This vessel 2 has a plurality of entry ports 8 in the first 4 and second 5 tubes of the vessel 2. The entry ports 8 in the first tube 4 are for the purpose of introducing the process components for the required reaction—such as monomers, surfactants and/or colloids—together with an initiator, to the reactor vessel 2. The entry ports 9 in the second tube 5 are for the purpose of introducing a second initiator, should one be required for a particular reaction. Each of the following tubes 3 has at least one port 11 for sampling, and/or for measurement of pH and/or temperature.

The vessel 2 has an inlet in the form of a non-return valve 10 at a first end and an outlet 12 at a second end, selectively connectable to a recycle tank 14 or a drain or product tank 16. In addition, the vessel 2 has further outlets at various positions along the vessel 2 which are normally closed but which, depending on the reaction time required, may be used to remove the contents of the vessel before they reach the far end of the vessel 2, effectively shortening the length of the vessel 2.

The vessel contains approximately three hundred stainless steel annular baffles 18. Each baffle 18 has a free area ratio of 21%, and the baffles 18 are equally spaced apart along the length of the vessel (including the U-bends 6) with a distance of 1.8×tube diameter (D) between adjacent baffles 18 (ie with a baffle spacing of 72 mm).

The baffles 18 are supported by two 2 mm diameter stainless steel rods 20 welded therebetween. The baffles 18 and rods 20 are smooth to discourage solid deposits.

The recycle tank 14 stores the reaction medium for the process (eg water or oil), and is situated above the level of the vessel 2. The tank 14 is in communication with the inlet 12. The apparatus 1 further comprises a stainless steel pump 22, a stainless steel rotameter (TM) 24 to measure flow rate, and a valve 23 to control flow rate. The pump 22 propels the reaction medium through the reactor vessel 2 to the outlet 12 at a selected flow rate. During operation of the process the outlet 12 is in communication with the recycle tank 14 which in turn is in communication with the inlet 10 to permit recycling of the medium through the reactor vessel 2. When the process is complete, the outlet 12 is diverted to lead to the drain or product tank 16 to which the contents of the reactor vessel 2 are discharged.

The apparatus further includes a port 26 for the continuous introduction of nitrogen to the vessel 2 via a rotameter (TM) 27. Nitrogen is required to purge the medium of oxygen both prior to and during a reaction.

The apparatus 1 includes oscillation means in the form of stainless steel bellows 28, the operation of which oscillates the medium as it passes along the vessel 2. The entry ports 8 in the first tube 4 are positioned at sufficient distance from the bellows 28 to prevent any deposition on the surface of the bellows 28. The bellows 28 are driven by a motor of controllable speed. The frequency of oscillation is controlled by altering the speed of the motor. Frequencies of 0 to 10 Hz can be obtained. The preferred range of operation is 0 to 4 Hz.

The apparatus 1 includes temperature control means in the form of a water jacket (not shown). This jacket surrounds the reactor vessel 2 and is used to vary the temperature of the vessel 2. There are a number of ports 11 along the length of the vessel 2 at which the temperature can be measured.

The bellows 28 are situated sufficiently distant from the inlet 10 and thus the medium that, dependent on the reaction, the bellows 28 might not require cooling. The configuration of the bellows 28 prevents seepage of the medium from the vessel 2.

The bellows 28 are connected to a motor via a flying wheel having a connecting pin. Control of the amplitude of oscillation of the medium by the bellows 28 is achieved by adjusting the off-centre position of the connecting pin. Oscillating amplitudes of 0 to 20 mm can be obtained.

Each U-bend 6 includes a bleeding valve for releasing air 30 or for drainage 32.

The apparatus 1 may be horizontal or vertical.

The apparatus 1 includes a separate premixer in the form of a batch reactor 33.

This batch reactor 33 has a reactor vessel in the form of a vertical tube 34. The reactor vessel 34 has an inlet 35 and contains a number of identical annular baffles 36. The baffles 36 are equally spaced and linked by two 2 mm diameter rods 38 to form a baffle set. The baffle set is connected to a top disc where it joins a bearing and is connected via a flying wheel to a motor drive 40 provided with a speed control. The flying wheel has an adjustable connecting pin.

Oscillation of the baffle set is controllable by the motor drive. The frequency of oscillation of the baffle set is controllable by the speed control of the motor drive. The amplitude of oscillation of the baffle set is controllable by adjustment of the off-centre position of the connecting pin controls. This batch reactor 33 can be described as a batch oscillatory baffled reactor.

This apparatus 1 is suitable for use in a method of polymerization.

In this method of polymerizaiton the reactor vessel 2 is first washed using methyl-ethyl-ketone to remove any oil deposits. The washing process is repeated at least three or four times, and then deionised water is used to rinse the reactor vessel 2 throughout. An inert atmosphere is require for both the washing and polymerization process, and a continuous flow of nitrogen is applied to the nitrogen inlet 26 to purge the reactor vessel 2.

Once the reactor vessel 2 is ready, a pre-prepared aqueous medium is pumped from the recycle tank 14 through the rector vessel 2. The aqueous medium usually consists of a protective colloid, two surfactants and deionized water. As the medium flows forward through the reactor vessel 2 the bellows 28 are operated to oscillate the medium at a selected oscillation amplitude and a selected oscillation frequency. The rate of the flow is monitored by the rotameter (TM) 24. When the medium reaches the outlet of the reactor vessel 22 it is collected in the recycle tank 14 from which it is recycled through the reactor vessel 2. Continuous input of nitrogen purges oxygen from the medium.

The monomer to be polymerised is supplied to the batch oscillatory reactor 33 for premixing with an initiator. Ammonia solution is also added to adjust pH value. The baffles 36 in the reactor vessel 34 are oscillated vertically, thereby generating eddies which mix the two uniformly.

When suitably mixed, the fluid based mixture of monomer and initiator is pumped into the reactor vessel 2 via one of the ports 8, 9 therein at a controlled rate via a stainless steel pump 42 and rotameter 44. The entry port 8 selected depends on the mixing intensity required. For suspension polymerization, the monomer and initiator are introduced simultaneously, either premixed, or at separate ports 8. For inverse polymerisation a mixture of monomer and a first initiator is introduced at a port 8 in the first tube 4 of the vessel 2 to an oil phase typically consisting of isopar and a stabilizer and, after a period of between 3 and 5 minutes, a second initiator is then introduced at the port 9 at the point in the vessel 2 which has been reached by the admixture of monomer and first initiator after this time. The point in the vessel 2 reached by the mixture after this time depends upon the speed of flow as required, and the second initiator is introduced at an appropriate port 9 which can be in the second tube 5 of the vessel 2.

The time when the mixture is fed is noted and, depending on the type of polymerization process, the medium is recycled through the reactor vessel 2 for between 50 minutes and 2.5 hours. Polymerization takes place in the reactor vessel 2 over this period of time.

During polymerization, the fluid is mixed by the eddies generated as it flows through the stationary baffles 18. The eddies provide radial and axial motions in the fluid causing thorough and uniform mixing.

After the requisite period of time, the output is diverted to the drain or product tank 16 from which the content of the reactor vessel 2 is discharged. The polymer particles are then washed and filtered, and dried in an oven.

When the polymers made in the continuous oscillatory batch reactor are compared with those made in a traditional batch STR, results show that the continuous oscillatory batch reactor produces polymers with much narrower size distributions and much more uniform structure and shapes. In particular, very little unusable fine polymer is produced. This process is very versatile and, by varying factors such as the area of the hole in the baffles and/or the baffle spacing and/or the oscillation amplitude and/or the oscillation frequency, production of a polymer of a required size is achievable.

Polymerization by this method also offers both significantly greater process control than known processes, and accurate reproducibility, In addition, the droplet sizes obtained from a sample taken at an early stage of the process allows accurate prediction of the particle sizes of polymers ultimately produced.

Uniform mixing, coupled with a small steady flow component to obtain a long residence time in the reactor vessel, allows the polymerization process to be operated in a continuous manner, and avoids the effect of the concentration gradient generated during the addition of monomer in batch operations on polymer particle size.

This apparatus and method is used to produce polyacrylamide, polymeethylmethacrylate, polystyrene or similar polymers. The method and apparatus is equally applicable to phase separated synthesis of a wide range of particulate materials including pharmaceutical, inorganic and organic crystals and particles, flocs, dyes, pigments and organic intermediates. The method and apparatus can be used for bead polymerization, particle flocculation, crystallization or fermentation.

The reactor 33 of the apparatus 1 is also adaptable for the synthesis of polymethylmethacrylate, polystyrene and polyacrylamide in a batch process. Experiments show that polymers made in the batch reactor 33 having less than 1% of fine particles, (ie less than 1% unusable product), and Gaussian particle size distribution.

A batch reactor 33 is suitable also for phase separated synthesis in a large scale. For this purpose the reactor vessel 34 can be of between 0.1 to 5 m in diameter.

Improvements and modifications may be made to the above without departing from the scope of the invention.

What is claimed is:

1. An apparatus for polymerization comprising:
   a reactor vessel;
   supply means to supply a substantially continuous feed of an aqueous medium through the reactor vessel; and
   oscillation means to oscillate liquid within the reactor vessel, said reactor vessel having:
   an inlet in fluid connection with said supply means;
   an outlet adaptable for fluid connection with said supply means;
   a plurality of stationary baffles; and
   at least one port for the introduction of one of process components and initiators;

wherein that said reactor vessel is provided with purging means to deter fouling, thereby adapting said apparatus for phase separated synthesis of particulates in a continuous manner.

2. An apparatus as claimed in claim 1 wherein said reactor vessel is provided with a plurality of ports for the introduction of one of process components and initiators.

3. An apparatus as claimed in claim 1 wherein said reactor vessel is in the form of a plurality of substantially parallel tubular sections connected in series.

4. An apparatus as claimed in claim 1 wherein said oscillation means comprises a chamber and a diaphragm reciprocably displaceable in said chamber.

5. An apparatus as claimed in claim 1 wherein said baffles are annular.

6. An apparatus as claimed in claim 1 wherein there is provided a temperature control means to vary the temperature of the reactor vessel.

7. An apparatus as claimed in claim 1 wherein said purging means comprises means to introduce nitrogen to said reactor vessel during operation of said supply means.

8. An apparatus as claimed in claim 1 further comprising premixing means to mix a process component and an initiator or initiators prior to their introduction to the reactor vessel.

9. An apparatus as claimed in claim 8 wherein said premixing means comprises a premixing reactor vessel comprising a plurality of premixing baffles; and drive means to oscillate said premixing baffles to mix the process component and the initiator or initiators.

10. An apparatus as claimed in claim 1 wherein said supply means comprises a reservoir positioned above the level of the reactor vessel.

11. A method of polymerization comprising the steps of:
   feeding a liquid aqueous medium substantially continuously through a reactor vessel provided with a plurality of stationary baffles;
   supplying a fluid containing at least one process component and an initiator or initiators to the vessel; and
   oscillating the liquid within the reactor vessel;
   wherein that said method comprises the step of introducing an inert gas to the medium to purge the medium to facilitate the phase separated synthesis of particulates of specified size in a continuous manner.

12. A method as claimed in claim 11 including the step of premixing a process component or process components with an initiator prior to their supply to the reactor vessel.

13. A method of polymerization in a continuous manner comprising the steps of:
   feeding a liquid aqueous medium substantially continuously through a reactor vessel provided with a plurality of stationary baffles;
   supplying a fluid containing at least one process component and an initiator or initiators to the reactor vessel; and
   oscillating the fluid in the reactor vessel to produce particulates of specified size.

14. A method as claimed in claim 13 including the step of premixing a process component or process components with an initiator prior to their supply to the reactor vessel.

15. An apparatus for phase separated synthesis of particulates in a batch process comprising:
   a reactor vessel provided with a plurality of baffles; and drive means to oscillate said baffles to mix fluid in the reactor vessel.

16. An apparatus as claimed in claim 15 wherein said reactor vessel is tubular.

17. An apparatus as claimed in claim 15 wherein said baffles are annular.

18. An apparatus as claimed in claim 15 further comprising temperature control means to vary the temperature of the contents of the reactor vessel.

19. An apparatus as claimed in claim 15 adapted merely to mix solutions.

20. A method of phase separated synthesis of particulates in a batch process comprising the steps of introducing fluid-based process components to a reactor vessel provided with a plurality of annular baffles adapted for reciprocal motion; and reciprocating said baffles.

21. A method of mixing solutions comprising the steps of introducing the solutions to a vessel provided with a plurality of annular baffles adapted for reciprocal motion; and reciprocating said baffles.

* * * * *